US012521304B1

(12) United States Patent
Jia

(10) Patent No.: US 12,521,304 B1
(45) Date of Patent: Jan. 13, 2026

(54) CRANKSHAFT SLIDER TYPE DRIVE MECHANISM AND A TONGUE SUCKING MASTURBATION CUP AND PERISTALTIC ANAL PLUG

(71) Applicant: Shenzhen Xiangle Health Technology Co., Ltd., Guangdong (CN)

(72) Inventor: Shiwen Jia, Guangdong (CN)

( * ) Notice: Subject to any disclaimer, the term of this patent is extended or adjusted under 35 U.S.C. 154(b) by 0 days.

(21) Appl. No.: 19/182,419

(22) Filed: Apr. 17, 2025

(51) Int. Cl.
*A61H 19/00* (2006.01)
*A61H 21/00* (2006.01)

(52) U.S. Cl.
CPC ............. *A61H 19/32* (2013.01); *A61H 21/00* (2013.01); *A61H 2201/1215* (2013.01); *A61H 2201/1436* (2013.01); *A61H 2201/149* (2013.01); *A61H 2201/1669* (2013.01)

(58) Field of Classification Search
None
See application file for complete search history.

(56) References Cited

U.S. PATENT DOCUMENTS 6,039,703 A * 3/2000 Badilla .................. A61H 7/001 601/134
12,280,004 B1 * 4/2025 Zhao .................. A61H 23/0254
2009/0069730 A1 * 3/2009 Knyrim .............. A61H 23/0263 601/134
2009/0093673 A1 * 4/2009 Lee ........................ A61H 19/44 600/38
2009/0198158 A1 * 8/2009 Nan ................... A61H 23/0254 601/87
2010/0041944 A1 * 2/2010 Levy ...................... A61H 19/32 600/38
2010/0130897 A1 * 5/2010 Knyrim .................. A61H 19/44 601/89
2010/0152631 A1 * 6/2010 Knyrim .............. A61H 23/0254 601/89
2015/0196454 A1 * 7/2015 Levy ...................... A61H 19/32 600/38
2016/0279020 A1 * 9/2016 Timmermans ......... A61H 19/00
2024/0277560 A1 * 8/2024 Hibri ...................... A61H 19/32

* cited by examiner

*Primary Examiner* — Thaddeus B Cox

(57) ABSTRACT

The present application discloses a crankshaft slider type drive mechanism and a tongue sucking masturbation cup and peristaltic anal plug, which are controlled and driven by a PCBA circuit board, and a reduction motor provides power and drives the crankshaft transmission mechanism to rotate. The crankshaft of the crankshaft transmission mechanism will make reciprocating movements up and down in sequence through a slider that cooperates with it, and the slider is connected to a massage pad to form a wave-shaped peristaltic massage effect, and the tongue sucking peristaltic massage is performed by bionic human tongue, and the massage area is continuously and indirectly rubbed, so that the massage object can provide blood circulation promotion, relax the body, and stimulate sensitive parts to achieve pleasure.

9 Claims, 16 Drawing Sheets

CRANKSHAFT SLIDER TYPE DRIVE MECHANISM AND A TONGUE SUCKING MASTURBATION CUP AND PERISTALTIC ANAL PLUG

FIELD OF THE APPLICATION

The present invention relates to the technical field of adult health products, specifically referring to a crankshaft slider type drive mechanism and a tongue sucking masturbation cup and peristaltic anal plug.

BACKGROUND

With the improvement of living standards and the increasing pressures of modern life and work, adult health products, particularly massagers, have grown significantly in popularity.

However, existing massagers rely on relatively rigid mechanical motions, typically driven by motors that rotate the massage components to produce their effects. These devices suffer from a monotonous massage mode, lack biomimetic realism, and fail to simulate the wave-like peristaltic motion of the human tongue during suction. As a result, user experiences often feel artificial and lack dynamic layering.

To address these limitations, some products have attempted multi-zone massage designs. Yet, constrained by traditional mechanical transmission systems and inflexible linkage structures, they struggle to achieve precise localized wave-like motions. The restricted range of motion in massage pads further limits their ability to replicate the dynamic characteristics of tongue-like suction.

To resolve these technical challenges, we propose a crankshaft-slider drive mechanism and introduce two innovative designs: a sucking-tongue aircraft cup and a peristaltic anal plug. These solutions enable biomimetic, wave-like peristaltic movements while enhancing flexibility and motion range for more lifelike user experiences.

SUMMARY

Technical Problem Addressed by the Invention

The present invention aims to address the technical deficiencies described above by providing a crankshaft-slider drive mechanism, a tongue-simulating suction aircraft cup, and a peristaltic anal plug, all of which enhance biomimetic performance and user experience.

Objectives of the Invention

The first objective of the present invention is to provide a crankshaft-slider drive mechanism configured to generate wave-like peristaltic motion, thereby improving the realism and dynamic layering of massage effects.

The second objective of the present invention is to provide a tongue-simulating suction aircraft cup incorporating the aforementioned drive mechanism. This device mimics the wave-like peristaltic motion of a human tongue during suction, delivering biomimetic massage functionality.

The third objective of the present invention is to provide a peristaltic anal plug incorporating the aforementioned drive mechanism. The plug replicates wave-like peristaltic motion to enhance therapeutic massage effects and user comfort.

A crankshaft slider type drive mechanism, comprising a housing, a PCBA control board, a geared motor, a support guide mechanism and a crankshaft drive mechanism; wherein the PCBA control board is arranged in the housing; wherein a motor mount is provided at one end of the housing, and a reduction motor is installed in the motor mount; wherein the support and guide mechanism is arranged on one side of the motor mount inside the housing; wherein the crankshaft transmission mechanism is rotatably arranged on the support guide mechanism, and one end of the crankshaft transmission mechanism is connected to the reduction motor shaft; wherein the crankshaft transmission mechanism is provided with a plurality of sliders, the upper end of the slider is provided with a sliding groove, the slider cooperates with the crankshaft transmission mechanism through the sliding groove, and the slider is symmetrically provided with sliding plates on both sides, and the slider slides with the support guide mechanism through the sliding plates on both sides; the reduction motor drives the crankshaft transmission mechanism to rotate, and then drives the plurality of sliders to reciprocate up and down in sequence under the restriction of the support guide mechanism, forming a wave-like creeping motion.

The crankshaft transmission mechanism includes a drive wheel, a main shaft and a crankshaft; wherein the drive wheel is connected to the shaft of the reduction motor; wherein a plurality of main shafts are arranged in sequence, and the plurality of main shafts are coaxially arranged; wherein a crankshaft is arranged on one side of the main shaft; wherein linkage rods perpendicular to the crankshaft are arranged at both ends of the crankshaft; wherein the two ends of the crankshaft are connected to the corresponding main shaft through linkage rods; wherein the linkage rod connected to the main shaft is perpendicular to the main shaft; the crankshaft close to the drive wheel is connected to the drive wheel through a linkage rod; wherein the crankshaft and the drive wheel are not coaxial.

Wherein the angle between the eccentric directions of two adjacent crankshafts relative to the main shaft is 360° per number of sliders.

The support guide mechanism includes a support part and a rail portion, wherein a plurality of support parts are evenly arranged on the inner bottom wall of the housing, the main shaft is rotatably connected to the corresponding support part, and a rail portion is symmetrically arranged on one side of each support part on the inner bottom wall of the housing, and a sliding groove is arranged at the opposite ends of the two rail portions, and a slider is arranged between the two rail portions, and the slider is slidably matched with the slides and the sliding grooves on both sides.

The housing includes a left housing and a right housing, one side of the left housing and the other side of the right housing are butted and fixed by bolts; wherein each pair of the rail portions are respectively arranged at the bottom of the left housing and the bottom of the right housing.

The support part includes symmetrically arranged support plates, two of which are respectively arranged at the bottom of the left housing and the bottom of the right housing, and the butt ends of the two support plates are provided with semicircular grooves, the two semicircular grooves are butt-jointed to form a circle, and the main shaft is rotatably arranged in the butt-jointed circle.

The left and right housings are provided with multiple slots at the butt ends, and the PCBA control board is provided with a charging port, which extends from one of the slots; wherein the bottom of the butt ends of the left and right housings and the position corresponding to the slider are provided with slots, and the lower end of the slider extends from the slot to the lower part of the housing, and the end of the slider extending to the lower part of the housing is provided with a locking head.

Wherein a battery is provided on one side of the motor mount in the housing.

A tongue sucking masturbation cup, comprising a drive mechanism and a cup body; the cup body has a chamber for accommodating massage elements, the upper end of the cup body is provided with a mounting chamber, the driving mechanism is arranged in the mounting chamber, and the top of the housing protrudes from the mounting chamber, a massage pad is arranged on the top of the chamber, a pleated connecting part is arranged around the massage pad, the outer periphery of the pleated connecting part and the top wall of the chamber are integrally formed, and the massage pad and the upper part of the pleated connecting part are located in the mounting chamber; the massage pad is provided with a massage element at the lower end; the upper end of the massage pad and the position corresponding to the slider are both provided with a raised portion, a clamping groove is provided in the raised portion, the slider extends into the installation cavity, and is connected through a clamping joint and the clamping groove; when the reduction motor drives the crankshaft transmission mechanism to rotate, the slider drives the massage pad to reciprocate up and down from one end to the other end in turn, forming a wave-shaped peristaltic massage.

A peristaltic anal plug, comprising a drive mechanism and a plug body; the driving mechanism is arranged inside the plug body; when the reduction motor drives the crankshaft transmission mechanism to rotate, the slider drives the outer wall of the plug body to reciprocate up and down from one end to the other end in turn, forming a wave-shaped peristaltic massage.

Advantages of the Invention Over Prior Art

The present invention offers the following advantages:

Biomimetic Wave-Like Peristaltic Motion

A rechargeable battery powers the system, while a PCBA control board governs operation. A geared motor drives a crankshaft transmission mechanism, causing the crankshaft to actuate a slider assembly. This slider reciprocates vertically to move a massage pad in a wave-like peristaltic pattern, simulating the suction and undulating motion of a human tongue. This intermittent friction massage stimulates blood circulation, induces muscle relaxation, and targets sensitive areas to enhance stimulation.

Adjustable Performance and Precision

The PCBA control board modulates the geared motor's rotational speed, enabling tunable localized peristaltic intensity and frequency. This ensures soft yet forceful massage with precise targeting, optimized comfort, and customizable therapeutic effects. The system operates quietly and is user-friendly.

Flexible Structural Design

The massage pad is peripherally integrated with a pleated connection portion, which merges seamlessly with the chamber's upper wall. This corrugated structure accommodates expansion during wave-like motion, allowing the pad to replicate lifelike tongue-simulating suction when activated.

Compact and Functional Form Factor

The tongue-simulating suction aircraft cup is portable, enabling discreet use while delivering oral-like stimulation. Additionally, it addresses clinical needs such as penile erectile dysfunction and prolonged erection challenges, broadening its therapeutic applicability.

Enhanced User Experience

The peristaltic anal plug incorporates the above mechanisms to provide realistic, wave-like stimulation, significantly improving user satisfaction and comfort.

BRIEF DESCRIPTION OF THE DRAWINGS

As shown in FIGS. 1-16:

Figure 1:
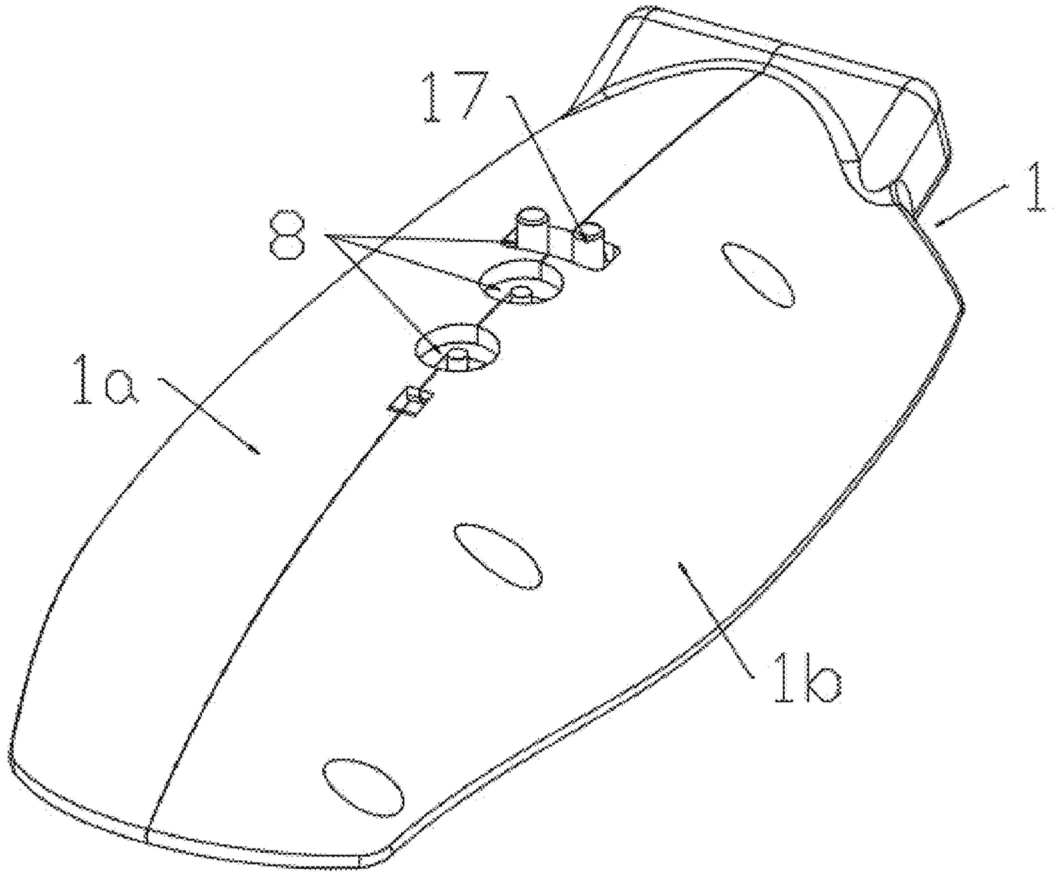
FIG. 1 is a top perspective schematic view of a crankshaft-slider drive mechanism, a tongue-simulating suction aircraft cup, and an anal plug according to the present invention.
Figure 2:
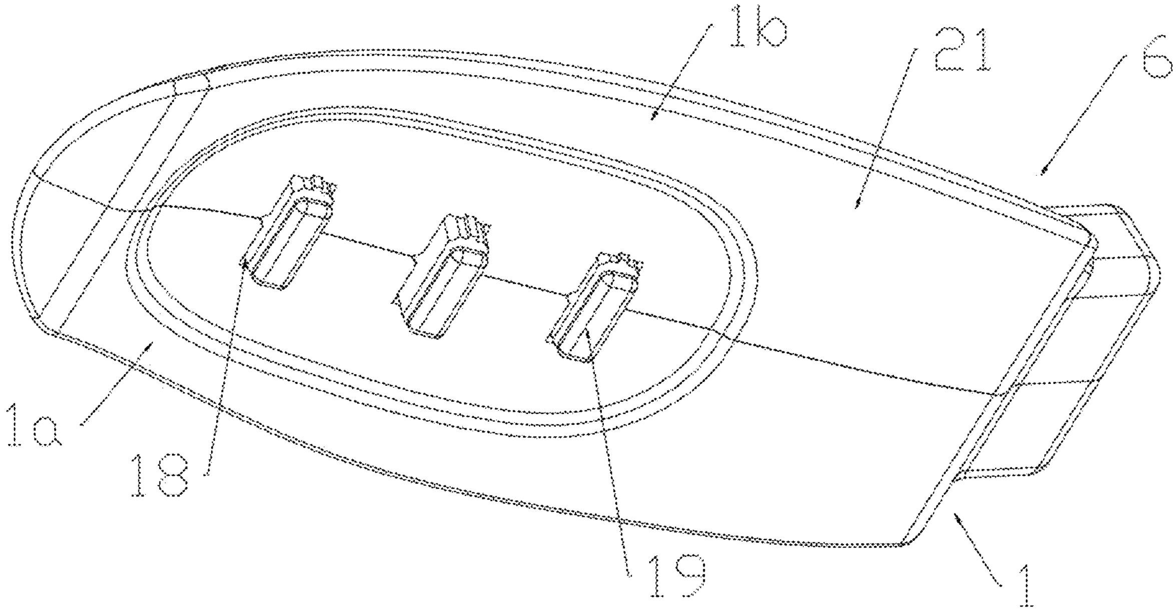
FIG. 2 is a bottom perspective schematic view of the crankshaft-slider drive mechanism, the tongue-simulating suction aircraft cup, and the anal plug according to the present invention.
Figure 3:
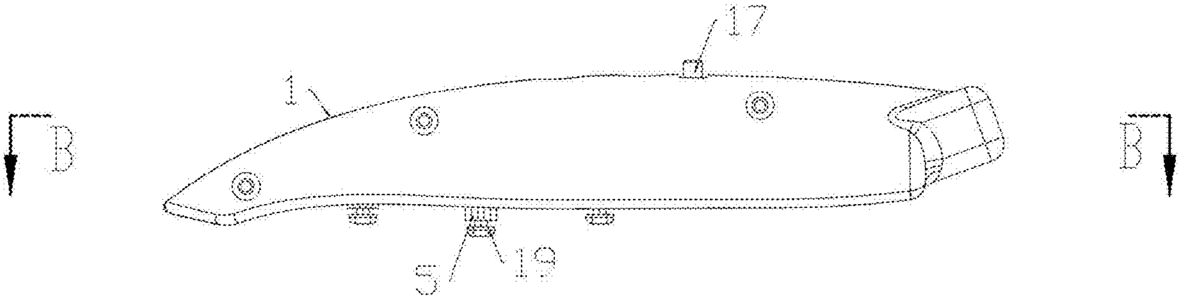
FIG. 3 is a side view of the crankshaft-slider drive mechanism, the tongue-simulating suction aircraft cup, and the anal plug according to the present invention.
Figure 4:
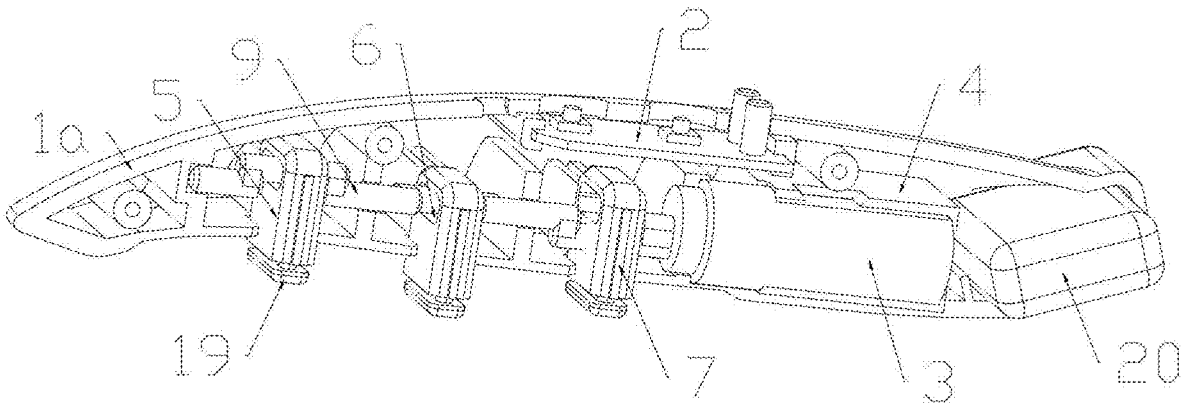
FIG. 4 is an exploded view of the crankshaft-slider drive mechanism, the tongue-simulating suction aircraft cup, and the anal plug according to the present invention.
Figure 5:
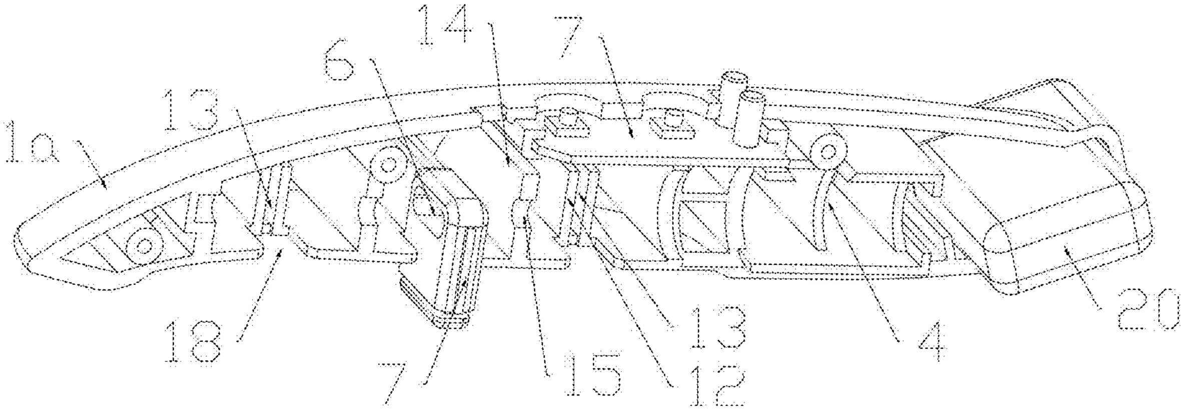
FIG. 5 is an internal structural view of the left housing of the crankshaft-slider drive mechanism, the tongue-simulating suction aircraft cup, and the anal plug according to the present invention.
Figure 6:
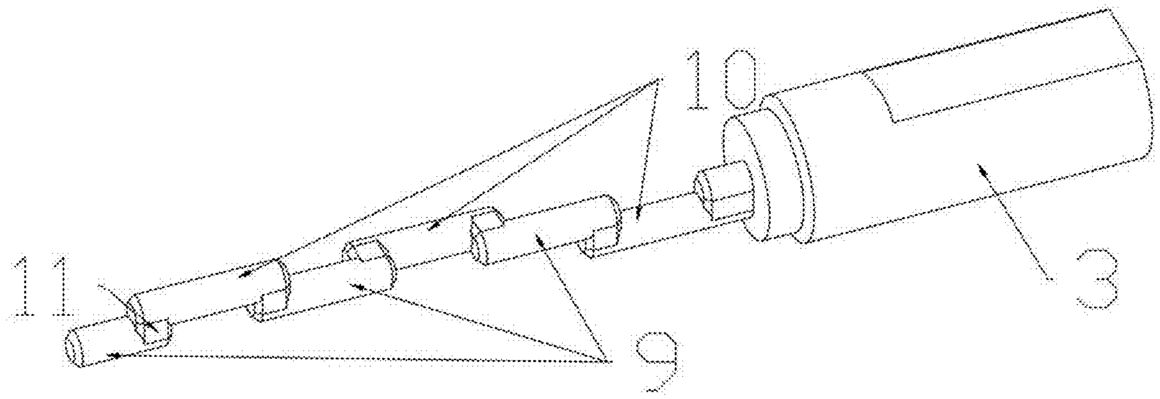
FIG. 6 is a schematic diagram of the crankshaft transmission mechanism of the present invention.
Figure 7:
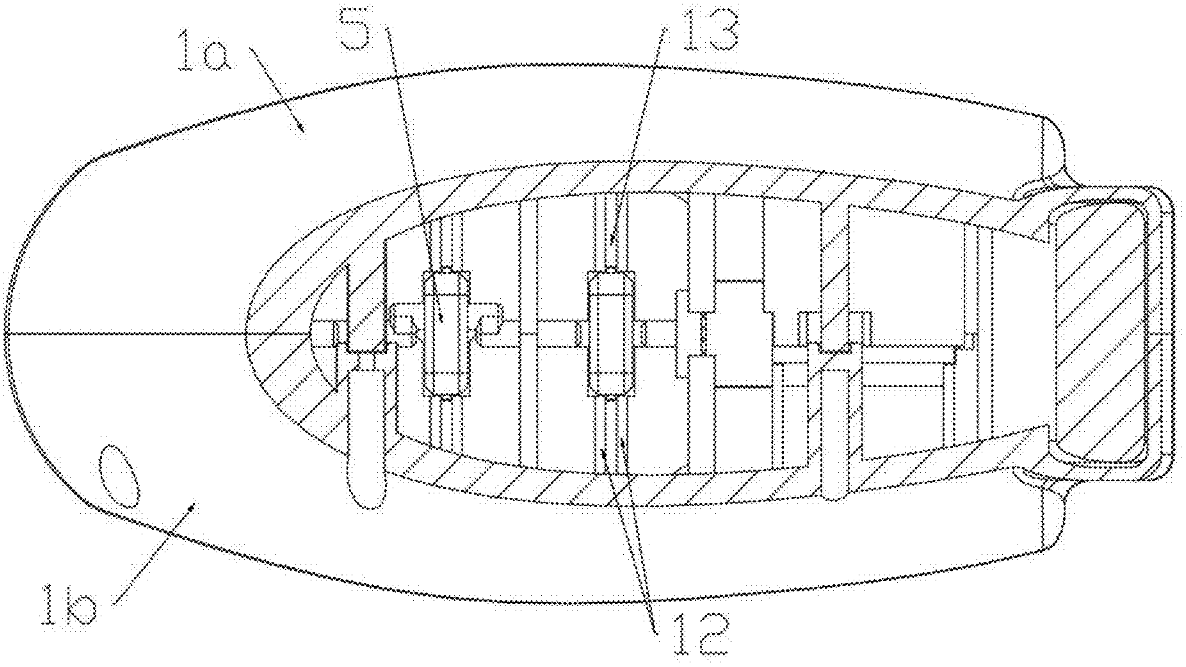
FIG. 7 is a cross-sectional view taken along line B-B of FIG. 3.
Figure 8:
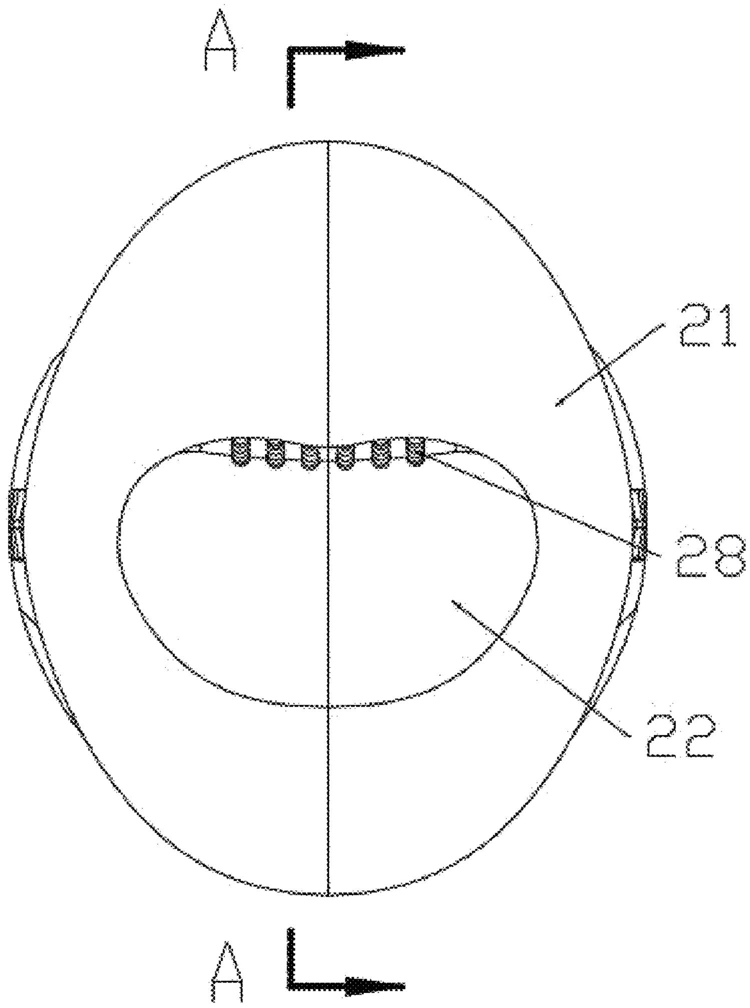
FIG. 8 is a front view of the tongue-simulating suction aircraft cup of the present invention.
Figure 9:
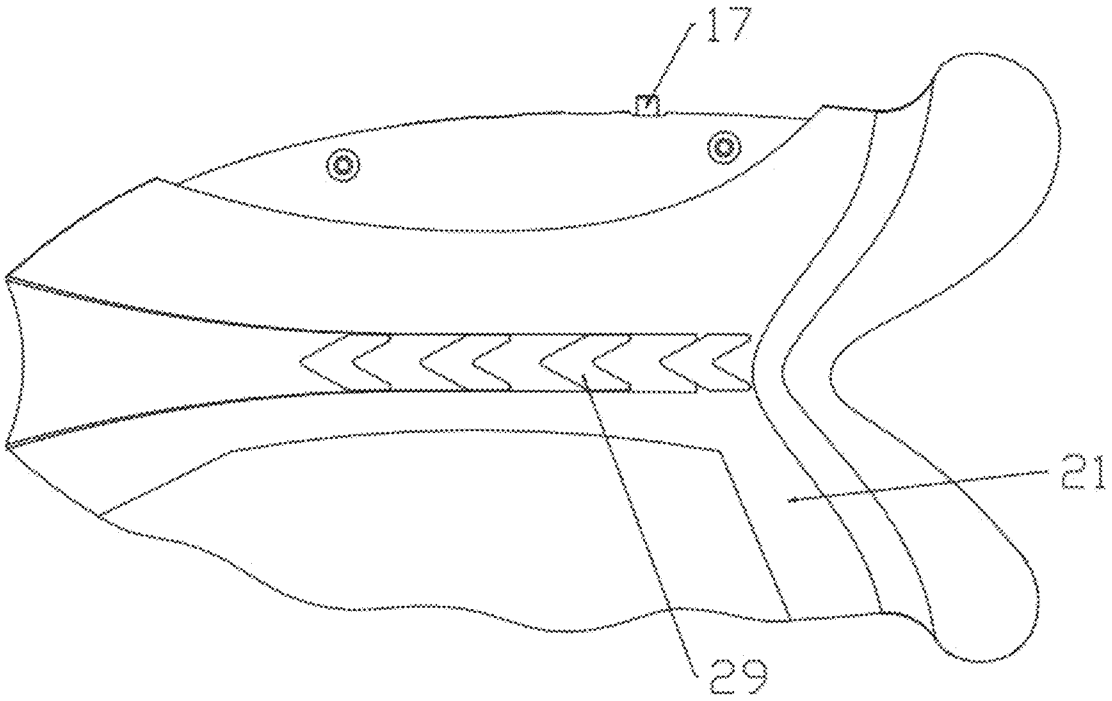
FIG. 9 is a side view of the tongue-simulating suction aircraft cup of the present invention.
Figure 10:
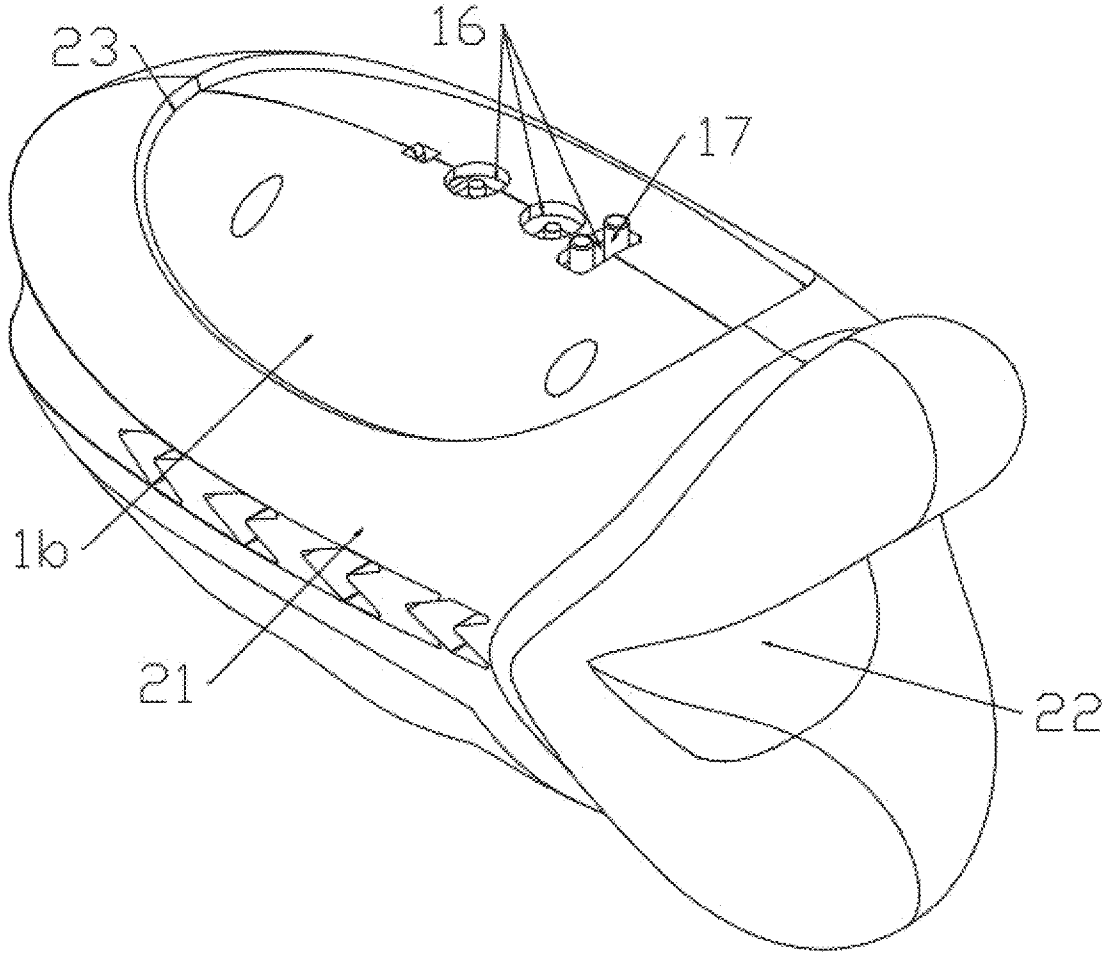
FIG. 10 is a top perspective schematic view of the tongue-simulating suction aircraft cup of the present invention.
Figure 11:
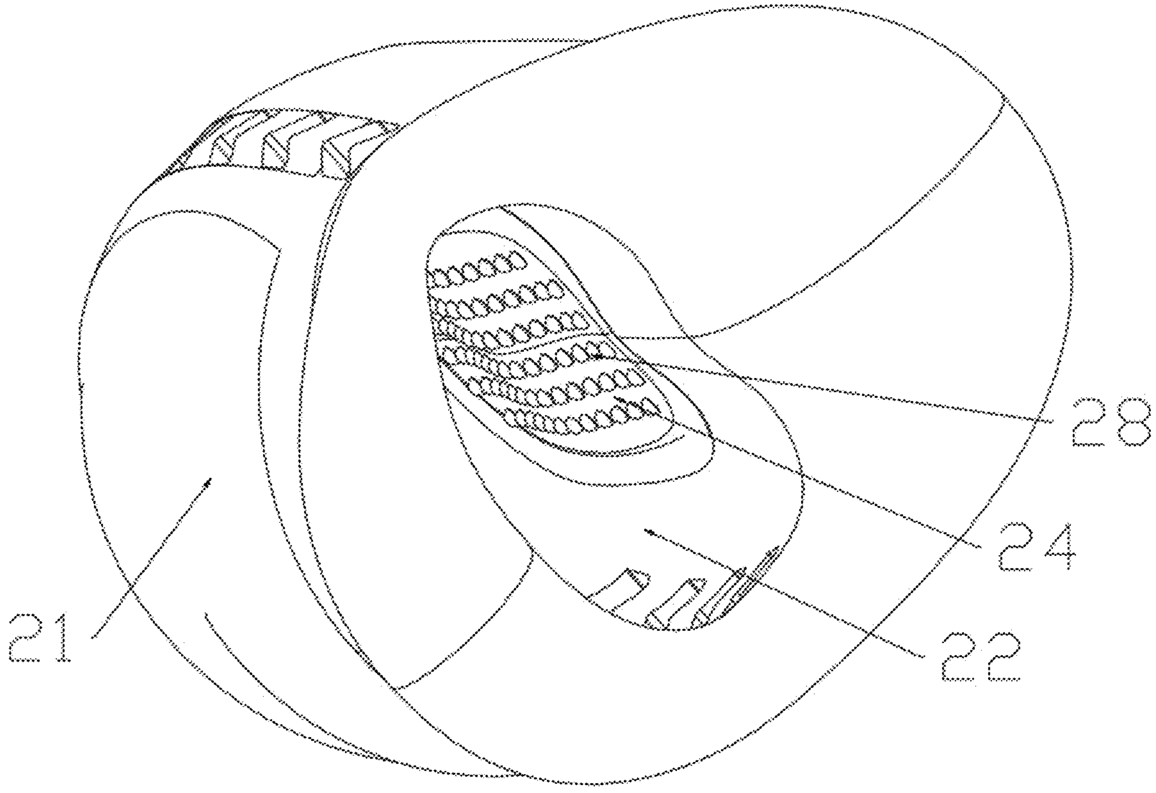
FIG. 11 is an end perspective schematic view of the tongue-simulating suction aircraft cup of the present invention.
Figure 12:
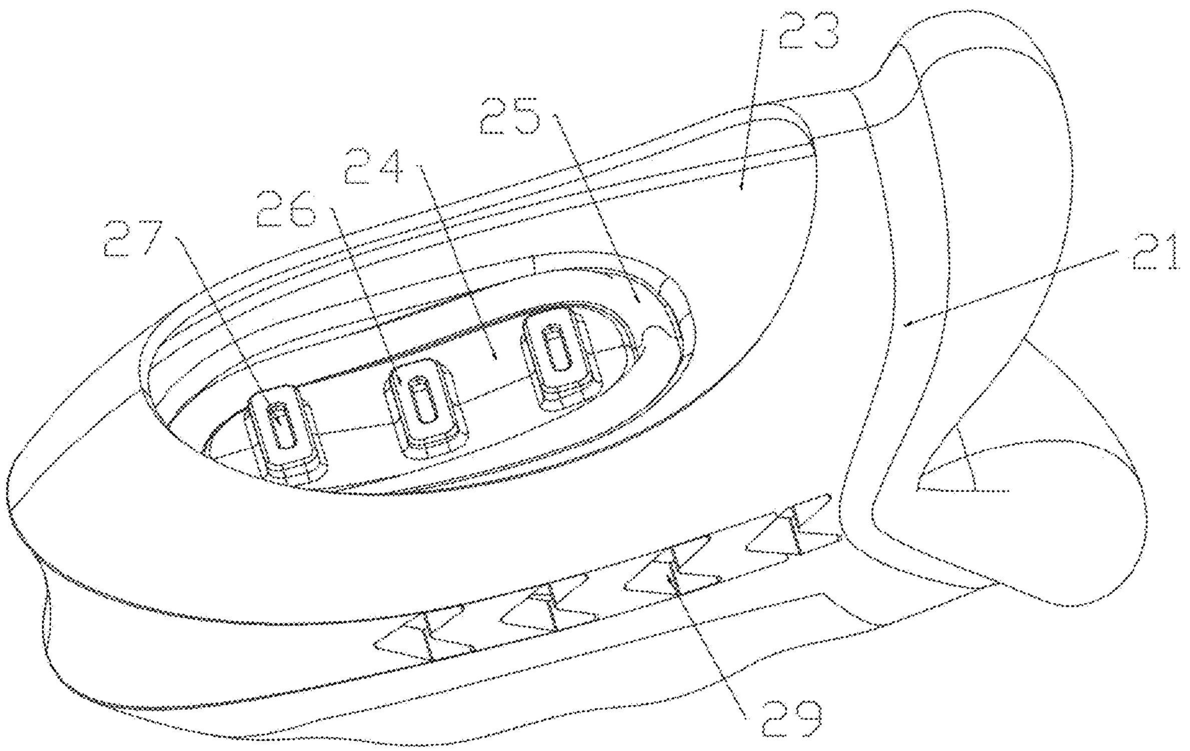
FIG. 12 is an exploded view of the tongue-simulating suction aircraft cup of the present invention.
Figure 13:
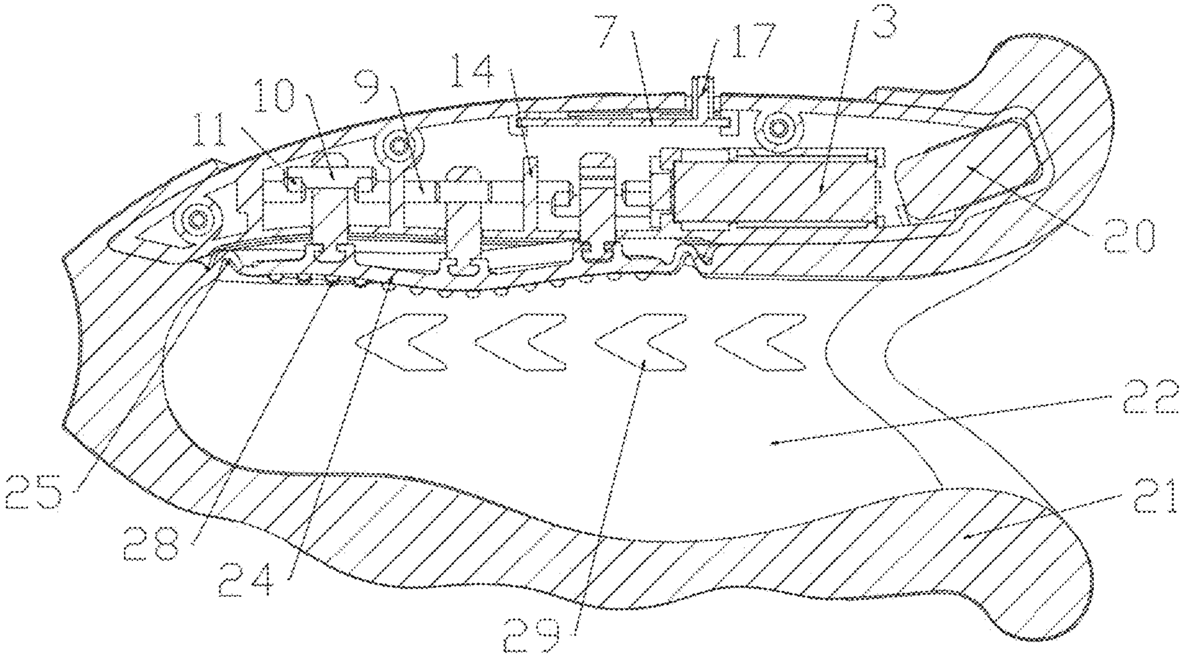
FIG. 13 is a cross-sectional view taken along line A-A of FIG. 8.

1. Housing
1*a*. Left housing
1*b*. Right housing
2. PCBA control board
3. Geared motor
4. Motor mount
5. Slider
6. Sliding groove
7. Guide plate
8. Drive wheel
9. Main shaft
10. Crankshaft
11. Linkage rod
12. Rail portion
13. Sliding channel

14. Support plate
15. Semicircular groove
16. Slotted aperture
17. Charging port
18. Notch
19. Locking head
20. Rechargeable battery
21. Cup body
22. Chamber
23. Mounting cavity
24. Massage pad
25. Pleated connection portion
26. Protrusion
27. Locking groove
28. Massage element
29. Ventilation aperture
30. Plug body While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The following detailed description, with reference to the accompanying drawings, further elaborates on the crankshaft slider type drive mechanism and a tongue sucking masturbation cup and peristaltic anal plug of the present invention.

With reference to FIGS. 1-16, a crankshaft-slider drive mechanism is characterized by comprising:

A housing (1);

A PCBA control board (2) disposed within the housing (1);

A geared motor (3), wherein:

A motor mount (4) is positioned at one end of the housing (1);

The geared motor (3) is installed within the motor mount (4);

The rotational speed of the geared motor (3) is controlled by the PCBA control board (2), thereby enabling adjustable peristaltic speed and intensity of a massage pad (24) to accommodate personalized user preferences;

A support-guide assembly disposed within the housing (1) adjacent to the motor mount (4);

A crankshaft transmission mechanism rotatably mounted on the support-guide assembly, wherein:

One end of the crankshaft transmission mechanism is coupled to the output shaft of the geared motor (3);

The crankshaft transmission mechanism includes multiple sliders (5), each slider (5) comprising:

A sliding groove (6) formed on its upper end, wherein the slider (5) engages with the crankshaft transmission mechanism via the sliding groove (6);

Symmetrically arranged guide plates (7) on both sides of the slider (5), wherein the slider (5) slidably cooperates with the support-guide assembly through the guide plates (7).

The geared motor (3) drives the crankshaft transmission mechanism to rotate, thereby actuating the multiple sliders (5) to perform sequential reciprocating vertical motion constrained by the support-guide assembly. This motion generates a wave-like peristaltic pattern.

The crankshaft transmission mechanism comprises:

A drive wheel (8) coupled to the output shaft of the geared motor (3);

Multiple main shafts (9) arranged coaxially in series;

Crankshafts (10), wherein:

Each crankshaft (10) is positioned laterally adjacent to a corresponding main shaft (9);

Linkage rods (11) are orthogonally fixed to both ends of each crankshaft (10);

The linkage rods (11) at each end of the crankshaft (10) connect to the corresponding main shaft (9), with the linkage rods (11) oriented perpendicular to the main shaft (9);

The crankshaft (10) closest to the drive wheel (8) is connected to the drive wheel (8) via its linkage rods (11), wherein the crankshaft (10) and the drive wheel (8) are non-coaxially aligned.

The main shaft (9) is rotatably coupled to the support-guide assembly. Each slider (5) engages with the crankshaft (10) via the sliding groove (6).

The angle between the eccentric directions of two adjacent crankshafts (10) relative to the main shaft (9) is defined as 360° divided by the number of sliders (5).

The support-guide assembly comprises:

Support portions uniformly disposed on the inner bottom wall of the housing (1), wherein each main shaft (9) is rotatably connected to a corresponding support portion;

Rail portions (12) symmetrically arranged on both sides of each support portion along the inner bottom wall of the housing (1).

The support portions and rail portions (12) are interspersed across the inner bottom of the housing (1) and linearly aligned.

Each rail portion (12) includes:

A sliding channel (13) formed at the opposing ends of each pair of rail portions (12);

A slider (5) positioned between each pair of rail portions (12), wherein the slider (5) is slidably engaged with the sliding channels (13) via the guide plates (7) on both sides.

The sliding channels (13) constrain and guide the sliders (5) to perform linear reciprocating motion along the sliding channels (13).

The housing (1) comprises a left housing (1*a*) and a right housing (1*b*), wherein:

The left housing (1*a*) and the right housing (1*b*) are joined at their mating edges and bolted together, facilitating installation and disassembly.

Each pair of rail portions (12) is mounted on the bottom of the left housing (1*a*) and the right housing (1*b*), respectively.

The support portion includes symmetrically arranged support plates (14), wherein:

A first support plate (14) is mounted on the bottom of the left housing (1*a*);

A second support plate (14) is mounted on the bottom of the right housing (1*b*);

The abutting ends of both support plates (14) are formed with semicircular grooves (15), which collectively define a complete circular bore when the left housing (1*a*) and right housing (1*b*) are assembled;

The main shaft (9) is rotatably seated within the circular bore formed by the aligned semicircular grooves (15).

The mating ends of the left housing (1*a*) and right housing (1*b*) are each provided with multiple slotted apertures (16). The PCBA control board (2) is equipped with a charging port (17), which extends through one of the slotted apertures (16) to charge a rechargeable battery (20), ensuring continuous operation of the device.

The bottom edges of the mating ends of the left housing (1*a*) and right housing (1*b*) are further formed with notches (18) aligned with the positions of the sliders (5). The lower ends of the sliders (5) extend through the notches (18) into the lower region of the housing (1). Each slider (5) terminates at its extended end with a locking head (19).

A rechargeable battery (20) is disposed adjacent to the motor mount (4) within the housing (1) and electrically connected to the PCBA control board (2) via wiring, thereby powering the system.

With reference to FIGS. 1-16, the tongue-simulating suction aircraft cup incorporates the aforementioned crankshaft-slider drive mechanism and further comprises:

Cup Body (21):

Constructed from medical-grade silicone for biocompatibility and enhanced user comfort.

Defines an internal chamber (22) for accommodating a user's anatomical region.

Includes an upper mounting cavity (23) extending outwardly from the cup body (21), wherein the drive mechanism is housed within the mounting cavity (23), and the housing (1) protrudes from the mounting cavity (23).

Massage Assembly:

A massage pad (24) is disposed at the top of the chamber (22), surrounded by a pleated connection portion (25).

The pleated connection portion (25) is integrally formed with the upper wall of the chamber (22).

The massage pad (24) and pleated connection portion (25) extend partially into the mounting cavity (23).

The lower surface of the massage pad (24) is equipped with protruding silicone spherical elements (28) to amplify stimulation.

Mechanical Engagement:

The upper surface of the massage pad (24) includes protrusions (26) aligned with the sliders (5), each protrusion (26) containing a locking groove (27).

The sliders (5) extend into the mounting cavity (23) and engage with the locking grooves (27) via the locking heads (19).

Actuation of the geared motor (3) drives the crankshaft transmission mechanism, causing the sliders (5) to reciprocate vertically and sequentially, thereby inducing a wave-like peristaltic motion in the massage pad (24).

Structural Flexibility:

The pleated connection portion (25), made of medical-grade silicone, provides elastic deformability and accommodates expansion during peristaltic motion, enabling biomimetic tongue-like suction effects.

The silicone material has a Shore hardness between 0-30 degrees to balance softness, elasticity, and functional deformation.

Ventilation Design:

A plurality of arrow-shaped ventilation apertures (29) are symmetrically formed on opposing sidewalls of the cup body (21).

These apertures (29) fluidly connect the chamber (22) to the external environment, preventing adhesion between the user's skin and the cup body (21).

The peristaltic anal plug incorporates the aforementioned crankshaft-slider drive mechanism and further comprises:

Plug Body (30):

Constructed from medical-grade silicone for biocompatibility and enhanced user comfort.

The drive mechanism is housed within the plug body (30).

Operational Mechanism:

Actuation of the geared motor (3) drives the crankshaft transmission mechanism, causing the sliders (5) to reciprocate vertically along the outer wall of the plug body (30) in a sequential wave-like pattern.

This motion generates a wave-like peristaltic massage effect, simulating biomimetic tongue-suction dynamics to enhance user experience.

Modular Adaptability:

The crankshaft-slider drive mechanism is modular and can be integrated into other adult wellness products, including but not limited to:

Penile massagers and clitoral stimulators for targeted erogenous zone therapy.

Sensual massage rods and breast massagers for expanded therapeutic applications.

The biomimetic tongue-like peristaltic motion enables versatile use across diverse intimate care scenarios.

Detailed Embodiment 1

As shown in FIGS. 1-7, the present invention operates as follows in practical implementation:

Speed and Intensity Control:

The PCBA control board (2) regulates the rotational speed of the geared motor (3), enabling adjustable peristaltic massage speed and intensity.

Low-speed mode (80 RPM): Generates a gentle wave-like massage with 4 mm amplitude and 2.5 Hz frequency.

High-speed mode (250 RPM): Delivers intense stimulation with 6 mm amplitude and 8 Hz frequency.

Mechanical Motion Conversion:

The geared motor (3) drives the crankshaft transmission mechanism to rotate.

The interaction between the crankshaft (10) and the sliding groove (6) of the slider (5), combined with the guide plates (7) sliding within the sliding channels (13), converts the crankshaft's rotational motion into vertical reciprocating motion of the sliders (5).

Phase-Angle Design:

The angular offset between adjacent crankshafts (10) and main shafts (9) is calculated as:

$$\text{Design Angle}=360^{\circ}/\text{Number of Sliders}$$

For example, with three sliders (5), the crankshafts are phased at 1200 intervals. During operation, the sequential vertical motion of the sliders (5) generates a continuous wave-like peristaltic pattern, replicating the biomimetic tongue-suction effect.

Operational Workflow

Upon user selection of a speed mode, the PCBA control board (2) adjusts the geared motor's RPM.

The crankshaft transmission mechanism converts rotational motion into reciprocating slider motion via constrained sliding channels (13).

Phase-synchronized sliders (5) drive the massage pad (24) to produce biomimetic wave-like undulations.

Detailed Embodiment 2

As shown in FIGS. 8-13, the drive mechanism is integrated into a tongue-simulating suction aircraft cup, with the following operational details:

Speed and Intensity Modulation:

The PCBA control board (2) adjusts the rotational speed of the geared motor (3) to regulate the peristaltic speed and intensity of the massage pad (24).

Low-speed mode (80 RPM): Produces a soothing wave-like massage with 4 mm amplitude and 2.5 Hz frequency.

High-speed mode (250 RPM): Generates intense stimulation with 6 mm amplitude and 8 Hz frequency.

The pleated connection portion (25) dynamically compensates for motion displacement, ensuring smooth trajectory and expansion space during wave-like peristalsis.

Mechanical Motion Conversion:

The geared motor (3) drives the crankshaft transmission mechanism to rotate.

The crankshaft (10) engages with the sliding groove (6) of the slider (5), while the guide plates (7) on both sides of the slider (5) interact with the sliding channels (13).

This constrained engagement converts the crankshaft's rotational motion into vertical reciprocating motion of the sliders (5).

Phase-Angle Synchronization:

The angular offset between adjacent crankshafts (10) and main shafts (9) is calculated as:

Design Angle=360°/Number of Sliders

For three sliders (5), the crankshafts are phased at 1200 intervals. During operation, the sequential vertical motion of the sliders (5) drives the massage pad (24) to perform continuous wave-like undulations, replicating a biomimetic tongue-simulating suction effect.

Operational Workflow

The user selects a speed mode via the PCBA control board (2).

The crankshaft transmission mechanism converts rotational motion into reciprocating slider motion, guided by the sliding channels (13).

The pleated connection portion (25) accommodates expansion, ensuring smooth biomimetic motion.

Phase-synchronized sliders (5) actuate the massage pad (24) to simulate lifelike tongue-suction dynamics.

Detailed Embodiment 3

Figure 14:
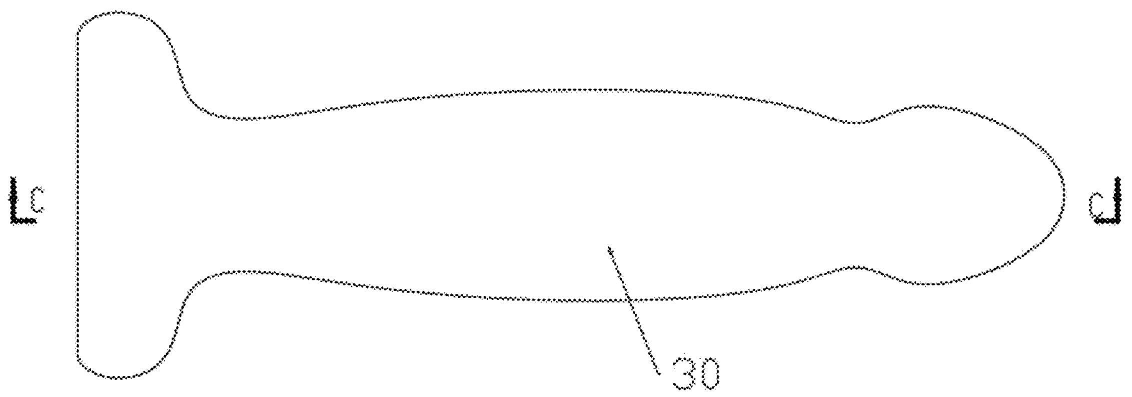
FIG. 14 is a side view of the anal plug of the present invention.
Figure 15:
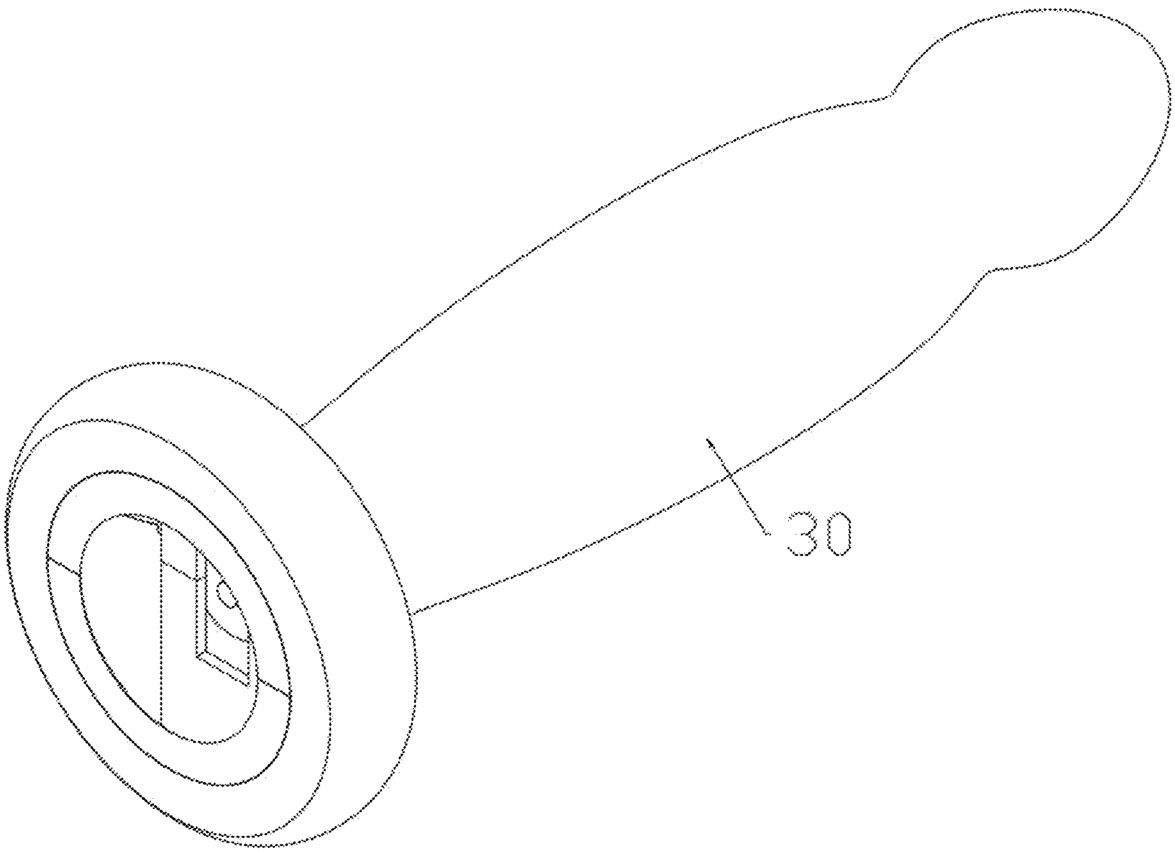
FIG. 15 is a perspective schematic view of the anal plug of the present invention.
Figure 16:
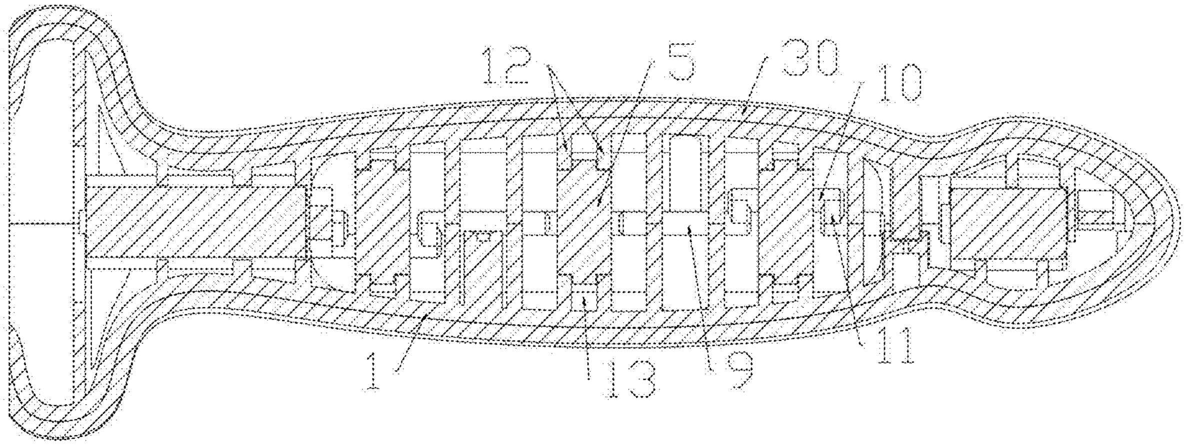
FIG. 16 is a cross-sectional view taken along line C-C of FIG. 14.

As shown in FIGS. 14-16, the drive mechanism is integrated into a peristaltic anal plug with the following operational specifics:

Adjustable Peristaltic Dynamics:

The PCBA control board (2) modulates the rotational speed of the geared motor (3) to regulate the peristaltic intensity and velocity of the sliders (5), thereby controlling the force and frequency of wall deformation in the plug body (30).

Low-speed mode (80 RPM): Generates gentle wave-like stimulation with 4 mm amplitude and 2.5 Hz frequency.

High-speed mode (250 RPM): Delivers high-intensity stimulation with 6 mm amplitude and 8 Hz frequency.

Mechanical Motion Conversion:

The geared motor (3) drives the crankshaft transmission mechanism to rotate.

The crankshaft (10) engages with the sliding groove (6) of the slider (5), while the guide plates (7) on both sides of the slider (5) interact with the sliding channels (13).

This constrained engagement converts the crankshaft's rotational motion into vertical reciprocating motion of the sliders (5), which sequentially deform the wall of the plug body (30).

Phase-Angle Synchronization:

The angular offset between adjacent crankshafts (10) and main shafts (9) is calculated as:

Design Angle=360°/Number of Sliders

For three sliders (5), the crankshafts are phased at 1200 intervals. During operation, the alternating vertical motion of the sliders (5) drives the plug body (30) to produce continuous wave-like peristaltic compression, simulating therapeutic massage effects.

Operational Workflow:

The user selects a speed mode via the PCBA control board (2).

The crankshaft transmission mechanism converts rotational motion into reciprocating slider motion, guided by the sliding channels (13).

Phase-synchronized sliders (5) exert sequential pressure on the plug body (30), generating biomimetic wave-like undulations for enhanced user stimulation.

What is claimed is:

1. A crankshaft-slider drive mechanism, comprising a housing, a PCBA control board, a geared motor, a support guide mechanism and a crankshaft transmission mechanism; wherein the PCBA control board is arranged in the housing; wherein a motor mount is provided at one end of the housing, and the geared motor is installed in the motor mount; wherein the support guide mechanism is arranged on one side of the motor mount inside the housing; wherein the crankshaft transmission mechanism is rotatably arranged on the support guide mechanism, and one end of the crankshaft transmission mechanism is connected to a shaft of the geared motor; wherein the crankshaft transmission mechanism is provided with a plurality of sliders, an upper end of each of the sliders is provided with a sliding groove, each of sliders cooperates with the crankshaft transmission mechanism through the sliding groove, and each of sliders is symmetrically provided with sliding plates on both sides, and each of sliders slides with the support guide mechanism through the sliding plates on both sides; the geared motor drives the crankshaft transmission mechanism to rotate, and then drives the plurality of sliders to reciprocate up and down in sequence under a restriction of the support guide mechanism, forming a wave-like creeping motion.

2. The crankshaft-slider drive mechanism of claim 1, wherein the crankshaft transmission mechanism includes a drive wheel, main shafts and a crankshaft; wherein the drive wheel is connected to the shaft of the geared motor; wherein the main shafts are arranged in sequence, and the main shafts are coaxially arranged; wherein the crankshaft is arranged on one side of the main shafts; wherein linkage rods perpendicular to the crankshaft are arranged at both ends of the crankshaft; wherein two ends of the crankshaft are connected to the main shafts through the linkage rods; wherein the linkage rods connected to the main shafts are perpendicular to the main shafts; the crankshaft is connected to the drive wheel through the linkage rods; wherein the crankshaft and the drive wheel are not coaxial.

3. The crankshaft-slider drive mechanism of claim 2, wherein the support guide mechanism includes support parts and a rail portion, wherein the support parts are evenly arranged on an inner bottom wall of the housing, each of the main shafts is rotatably connected to a corresponding support part, and the rail portion is symmetrically arranged on one side of each support part on the inner bottom wall of the housing.

4. The crankshaft-slider drive mechanism of claim 3, wherein the housing includes a left housing and a right housing, one side of the left housing and an other side of the right housing are connected and fixed by bolts; wherein the rail portion is respectively arranged at a bottom of the left housing and a bottom of the right housing.

5. The crankshaft-slider drive mechanism of claim 4, wherein the support parts include symmetrically arranged support plates, two of which are respectively arranged at the bottom of the left housing and the bottom of the right housing, and butt ends of the two support plates are provided with semicircular grooves, two semicircular grooves are butt-jointed to form a circle.

6. The crankshaft-slider drive mechanism of claim 4, wherein the left and right housings are provided with multiple slots at the butt ends, and the PCBA control board is provided with a charging port, which extends from one of the slots; wherein a bottom of the butt ends of the left and right housings and a position corresponding to each of the sliders are provided with slots, and a lower end of each of the sliders extends from the slot to a lower part of the housing, and the lower end of the slider extending to the lower part of the housing is provided with a locking head.

7. The crankshaft-slider drive mechanism of claim 1, wherein a rechargeable battery is provided on one side of the motor mount in the housing.

8. A tongue sucking masturbation cup, comprising the crankshaft-slider drive mechanism of claim 1 and a cup body; the cup body has a chamber for accommodating massage elements, an upper end of the cup body is provided with a mounting chamber, a driving mechanism is arranged in the mounting chamber, and a top of the housing protrudes from the mounting chamber, a massage pad is arranged on a top of the mounting chamber, a pleated connecting part is arranged around the massage pad, an outer periphery of the pleated connecting part and a top wall of the mounting chamber are integrally formed, and the massage pad and an upper part of the pleated connecting part are located in the mounting chamber; the massage pad is provided with a massage element at a lower end; an upper end of the massage pad and a position corresponding to each of the sliders are both provided with a raised portion, each of the sliders extends into an installation cavity, and is connected through a clamping joint and a clamping groove; when geared motor drives the crankshaft transmission mechanism to rotate, each of the sliders drives the massage pad to reciprocate up and down from one end to an other end in turn, forming a wave-shaped peristaltic massage.

9. A peristaltic anal plug, comprising the crankshaft-slider drive mechanism of claim 1 and a plug body; a driving mechanism is arranged inside the plug body; when the geared motor drives the crankshaft transmission mechanism to rotate, each of the sliders drives an outer wall of the plug body to reciprocate up and down from one end to an other end in turn, forming a wave-shaped peristaltic massage.

* * * * *